US008953238B2

United States Patent
Kim et al.

(10) Patent No.: US 8,953,238 B2
(45) Date of Patent: Feb. 10, 2015

(54) HIGH-SPEED OPTICAL MODULATOR AND METHOD OF MODULATING LIGHT BY USING THE SAME

(75) Inventors: Ji-deog Kim, Seoul (KR); Yong-hwa Park, Yongin-si (KR); Yong-jun Park, Incheon (KR); Chang-kwon Hwangbo, Incheon (KR); Jang-hoon Lee, Seoul (KR); Jin-joo Kim, Incheon (KR)

(73) Assignees: Samsung Electronics Co., Ltd., Suwon-Si (KR); Inha-Industry Partnership Institute, Incheon (KR)

( * ) Notice: Subject to any disclaimer, the term of this patent is extended or adjusted under 35 U.S.C. 154(b) by 526 days.

(21) Appl. No.: 12/720,706

(22) Filed: Mar. 10, 2010

(65) Prior Publication Data
US 2010/0328750 A1 Dec. 30, 2010

(30) Foreign Application Priority Data
Jun. 24, 2009 (KR) .................. 10-2009-0056541

(51) Int. Cl.
*G02F 1/03* (2006.01)
*G02F 1/21* (2006.01)
(52) U.S. Cl.
CPC ............ *G02F 1/21* (2013.01); *G02F 2001/213* (2013.01)
USPC ........................................................ 359/245

(58) Field of Classification Search
USPC .................................. 359/245–254, 259, 260
See application file for complete search history.

(56) References Cited

U.S. PATENT DOCUMENTS

| 5,202,897 | A | 4/1993 | Whitehead | |
|---|---|---|---|---|
| 7,035,484 | B2 * | 4/2006 | Silberberg et al. | 385/1 |
| 7,199,927 | B2 * | 4/2007 | Uehara | 359/579 |

FOREIGN PATENT DOCUMENTS

| JP | 10-228005 A | 8/1998 |
|---|---|---|
| KR | 10-0155312 B1 | 7/1998 |
| KR | 10-0170477 B1 | 10/1998 |
| KR | 10-0254302 B1 | 2/2000 |
| KR | 10-0794667 B1 | 1/2008 |

* cited by examiner

*Primary Examiner* — Tuyen Tra
(74) *Attorney, Agent, or Firm* — Sughrue Mion, PLLC

(57) ABSTRACT

Provided are a high-speed optical modulator and a method of modulating light by using the same. The optical modulator includes first and second resonance cavities that are sequentially stacked on a transparent substrate, wherein the first and second resonance cavities each include an electric-optical layer. According to the method, first and second voltages having different sizes are simultaneously applied respectively to the first and second resonance cavities, and then for the other configuration of the modulator mutually interchanged voltages are applied.

7 Claims, 5 Drawing Sheets

HIGH-SPEED OPTICAL MODULATOR AND METHOD OF MODULATING LIGHT BY USING THE SAME

CROSS-REFERENCE TO RELATED APPLICATIONS

This application claims the benefit of Korean Patent Application No. 10-2009-0056541, filed on Jun. 24, 2009, in the Korean Intellectual Property Office, the disclosure of which is incorporated herein in its entirety by reference.

BACKGROUND

1. Field of the Invention

Exemplary embodiments relate to a high-speed optical modulator and a method of modulating light by using the same.

2. Description of the Related Art

Generally, a Fabry-Perot interferometer having a single cavity is used as a filter in order to quickly modulate a beam, such as a beam emitted from a laser diode, having a narrow light spectral bandwidth of 1 nm or below.

However, the degree of change of a refractive index of a material forming the single cavity is small. Accordingly, it is difficult to increase a difference between light intensity during an on-transmission status and light intensity during an off-transmission status, in a light source, such as a light emission diode (LED), having a wide light spectral bandwidth. The light intensity during the on-transmission status denotes the most amount of transmitted light and the light intensity during the off-transmission status denotes the least amount of transmitted light.

SUMMARY

One or more exemplary embodiments include an optical modulator and a method of modulating light, which increase light intensity during an on-transmission status, effectively increase a ratio of the light intensity during the on-transmission status to light intensity during an off-transmission status, and decrease the number of layers with respect to a light source having a broad bandwidth.

Additional exemplary aspects will be set forth in part in the description which follows and, in part, will be apparent from the description, or may be learned by practice of the presented embodiments.

According to one or more exemplary embodiments, an optical modulator includes: a transparent substrate; and first and second resonance cavities sequentially stacked on the transparent substrate, wherein the first and second resonance cavities each include an electric-optical layer.

The optical modulator may further include at least one third resonance cavity including an electric-optical layer.

The first and second resonance cavities may each further include a distributed Bragg reflector (DBR) layer and an electrode layer. The DBR layer may include an interfacial layer, and a high refractive index layer and a low refractive index layer that are alternately stacked in limited repetition.

The first and second resonance cavities may be stacked such that a DBR layer is common to the first and second resonance cavities.

According to one or more exemplary embodiments, a method of modulating light of an optical modulator, the method including: applying a first voltage to a first optical layer of a first resonance cavity, so as to change a refractive index of the first electric-optical layer; and applying a second voltage to a second optical layer of a second resonance cavity, so as to change a refractive index of the second electric-optical layer, wherein the magnitudes of the first and second voltages are different.

The first and second voltages may be applied in such a way that a transmission function in an on-transmission status is formed thereby. The first and second voltages may be applied in such a way that a transmission function in an off-transmission status is formed thereby.

The first voltage may be a voltage which causes the refractive index of the first electric-optical layer to have a maximum value. The first voltage may be a voltage which causes the refractive index of the first electric-optical layer to have a minimum value.

The second voltage may be a voltage which causes the refractive index of the second electric-optical layer to have a minimum value. The second voltage may be a voltage which causes the refractive index of the second electric-optical layer to have a maximum value.

The first and second voltages may be simultaneously applied, and then alternately applied.

BRIEF DESCRIPTION OF THE DRAWINGS

These and other exemplary aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
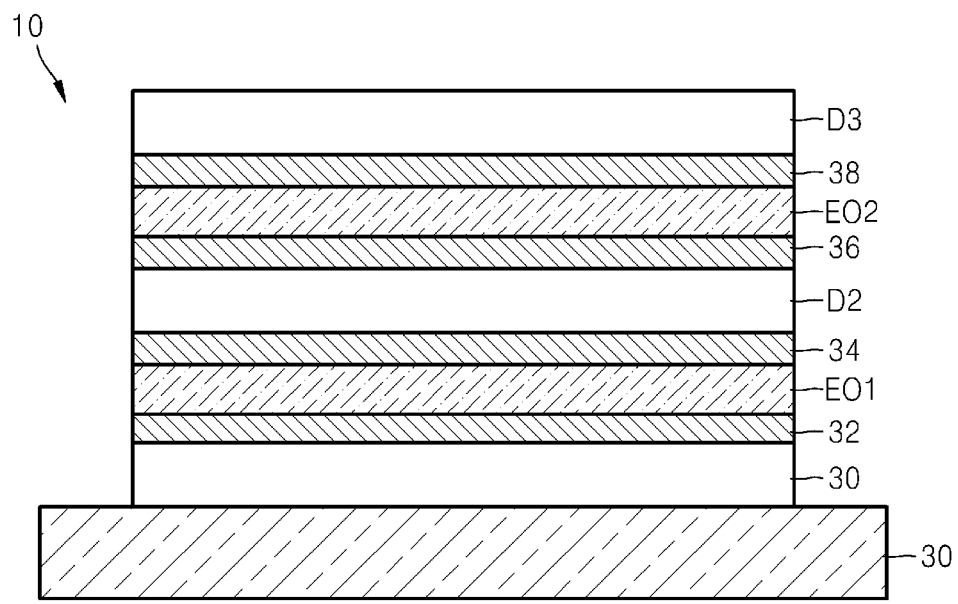
FIG. 1 is a cross-sectional view of an optical modulator according to an exemplary embodiment.

Reference will now be made in detail to embodiments, examples of which are illustrated in the accompanying drawings, wherein like reference numerals refer to the like elements throughout. In this regard, the exemplary embodiments may have different forms and should not be construed as being limited to the descriptions set forth herein. Accordingly, the embodiments are merely described below, by referring to the figures, to explain aspects of the present description.

FIG. 1 is a cross-sectional view of an optical modulator 10 according to an exemplary embodiment. The optical modulator 10 may use a Fabry-Perot-type filter.

Referring to FIG. 1, in the optical modulator 10, a first distributed Bragg Reflector (DBR) layer D1, a first electrode layer 32, a first electric-optical layer EO1, a second electrode layer 34, a second DBR layer D2, a third electrode layer 36, a second electric-optical layer EO2, a fourth electrode layer 38, and a third DBR layer D3 are sequentially stacked on a transparent substrate 30. The transparent substrate 30 is transparent to incident light, and may be formed of glass, sapphire, or any other transparent material. The first through third DBR layers D1 through D3 may each include a high refractive index material and a low refractive index material that are alternately stacked in limited repetition, wherein the number of stacked materials is determined according to an incident light. In order to increase transmission characteristics of each of the first through third DBR layers D1 through D3, the first through third DBR layers D1 through D3 may each further include an interfacial layer. The first through fourth electrode layers 32, 34, 36, and 38 are transparent electrode layers, and may be indium tin oxide (ITO) layers, ZnO layers, or AZO layers. The first and second electric-optical layers EO1 and EO2 may be formed of a material, such as a refractive index, that changes in optical characteristics according to an applied voltage. The first and second electric-optical layers EO1 and EO2 may each be an electric-optical crystal layer, such as potassium tantalum niobium (KTN) crystal, or an electric-optical polymer layer, such as 4'-dimethylamino-N-methyl-4-stilbazolium tosylate (DAST). The first and second electric-optical layers EO1 and EO2 may be formed of the same or different materials. The first and second DBR layers D1 and D2, the first and second electrode layers 32 and 34, and the first electric-optical layer EO1 may form a first cavity. Also, the second and third DBR layers D2 and D3, the third and fourth electrode layers 36 and 38, and the second electric-optical layer EO2 may form a second cavity. The second DBR layer D2 is shared by the first and second cavities. Also, the locations of the first and second cavities are selective, and thus may be switched. The first cavity may be a resonance cavity generating resonance with respect to light having a first wavelength incident on the optical modulator 10. The second cavity may be a resonance cavity generating resonance with respect to light having a second wavelength incident on the optical modulator 10. The lights having the first and second wavelengths may be simultaneously incident on the optical modulator 10. The first and second wavelengths may be different. The lights having the first and second wavelengths may be emitted from one light source. The light source may be a light emission diode (LED). When the light source is an LED, a spectral bandwidth of the light source is wider than that of a laser diode. Like the LED, when the spectral bandwidth is wide or asymmetrical, a light spectrum of the light source may be determined to have at least two symmetrical Gaussian peaks, as will be described in detail with reference to FIG. 2.

Figure 2:
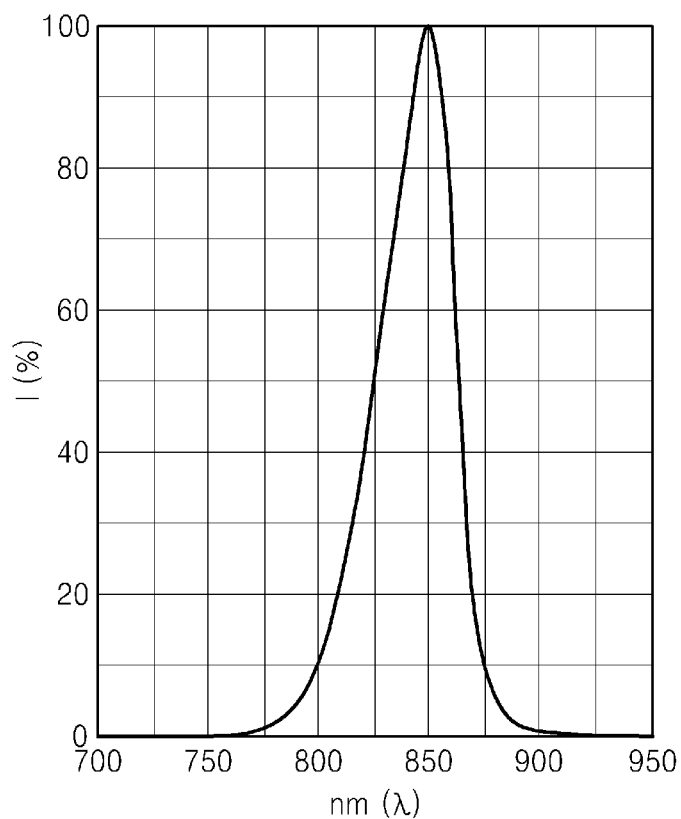
FIG. 2 is a graph of an optical spectrum of a light emission diode (LED) light source.

FIG. 2 illustrates an example of an optical spectrum of an LED light source. When the optical spectrum of FIG. 2 is analyzed using a general method, it is determined that the optical spectrum includes a main peak (not shown) having a central wavelength of 850 nm, and a secondary peak (not shown) having a central wavelength of 825 nm.

Peak values of the main peak and the secondary peak are in ratio of about 90:35, and a light intensity ratio of about 67:33. Also, full width at half maximums (FWHMs) of the main peak and secondary peak are respectively about 29 nm and 37 nm, and considering that an FWHM of the optical spectrum is 35 nm, the FWHM of the main peak is small. The first or second wavelength may be 850 nm, which is the central wavelength of the main peak, and the remaining wavelength may be 825 nm, which is the central wavelength of the secondary peak.

When the optical spectrum of the light source includes at least two peaks, each peak may be spaced apart from each other. For example, the central wavelength of the secondary peak may be spaced apart from the central wavelength of the main peak by the FWHM of the main peak or more.

When the light source has the optical spectrum of FIG. 2, the layers included in the optical modulator 10 of FIG. 1 may be suitably designed to have resonance characteristics with respect to the main peak and the secondary peak. In other words, the thicknesses and the materials of the first through third DBR layers D1 through D3, the number of layers that is alternately stacked in each of the first through third DBR layers D1 through D3, the refractive indexes and thicknesses of the first and second electric-optical layers EO1 and EO2, and the materials and thicknesses of the first through fourth electrode layers 32, 34, 36, and 38 may be designed so that the transmission light intensity has a maximum value during on-transmission. Such a design may be performed by using a well-known separate design tool. The refractive indexes or thicknesses of the first and second electric-optical layers EO1 and EO2 may also be adjusted so as to minimize the transmission light intensity during off-transmission.

Figure 3:
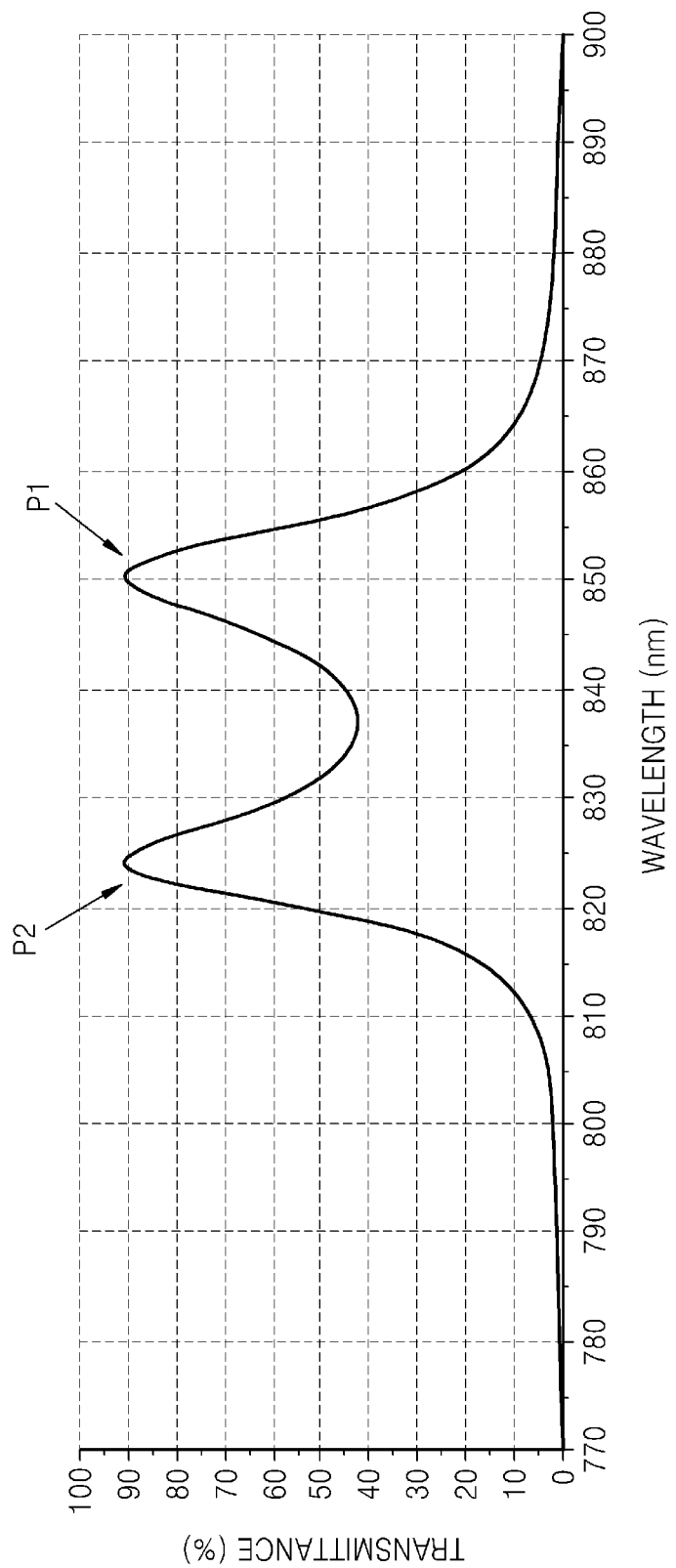
FIG. 3 is a graph of a transmission function in an on-transmission status of the optical modulator of FIG. 1.
Figure 4:
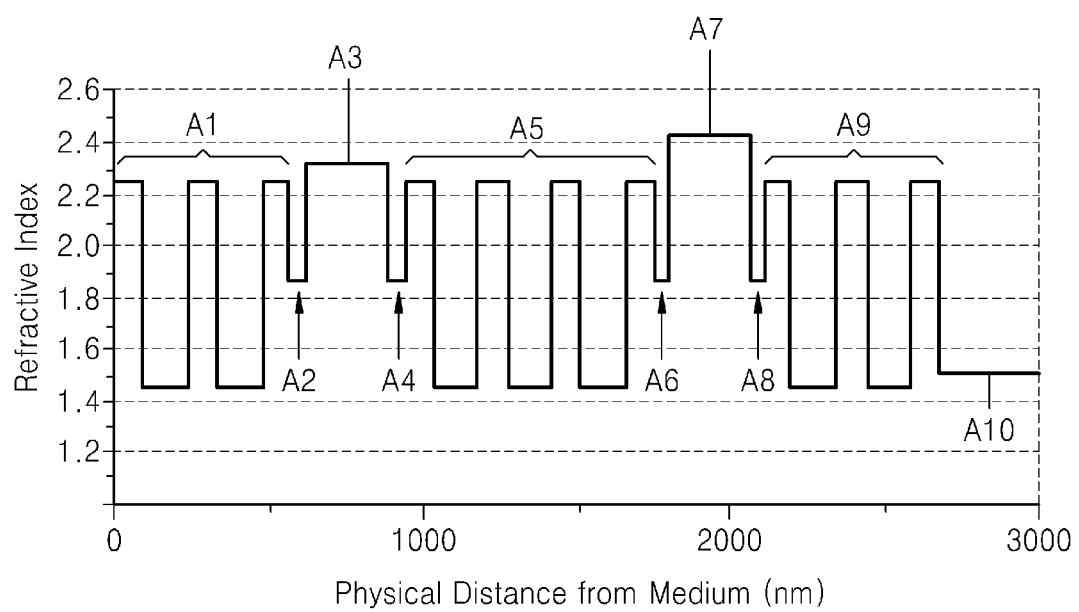
FIG. 4 is a graph of a refractive index profile of an optical modulator having the transmission function of FIG. 3.

FIG. 3 is a graph of a transmission function or a filter function in an on-transmission status of the optical modulator 10 of FIG. 1. In the transmission function of FIG. 3, a first peak P1 may correspond to the main peak of the LED, and a second peak P2 may correspond to the secondary peak of the LED. FIG. 4 illustrates an example of a refractive index profile of the optical modulator 10. When the optical modulator 10 has the refractive index profile of FIG. 4, the optical modulator 10 may have the transmission function in the on-transmission status as shown in FIG. 3, with respect to the LED. In FIG. 4, reference numerals A1, A5, and A9 respectively indicate refractive index profiles of the third, second, and first DBR layers D3, D2, and D1, and reference numerals A2, A4, A6, and A8 respectively indicate refractive index profiles of the fourth, third, second, and first electrode layers 38, 36, 34, and 32. Also, reference numerals A3 and A7 respectively indicate refractive index profiles of the second and first electric-optical layers EO2 and EO1. Also, reference numeral A10 indicates a refractive index profile of the transparent substrate 30. In FIG. 4, the refractive index profile A7 of the first electric-optical layer EO1 is a result of applying a voltage to the first electric-optical layer EO1 so that the refractive index of the first electric-optical layer EO1 has a maximum value. Also, the refractive index profile A3 of the second electric-optical layer EO2 is a result of applying a voltage to the second electric-optical layer EO2 so that the refractive index of the second electric-optical layer EO2 has a minimum value. Here, the voltages applied to the first and second electric-optical layers EO1 and EO2 may be different.

When the optical modulator 10 has the refractive index profile of FIG. 4, the optical modulator 10 may have the transmission function of FIG. 3. Accordingly, the optical modulator 10 may have excellent on-transmission characteristics with respect to the LED having the wide spectral bandwidth as shown in FIG. 2.

Figure 5:
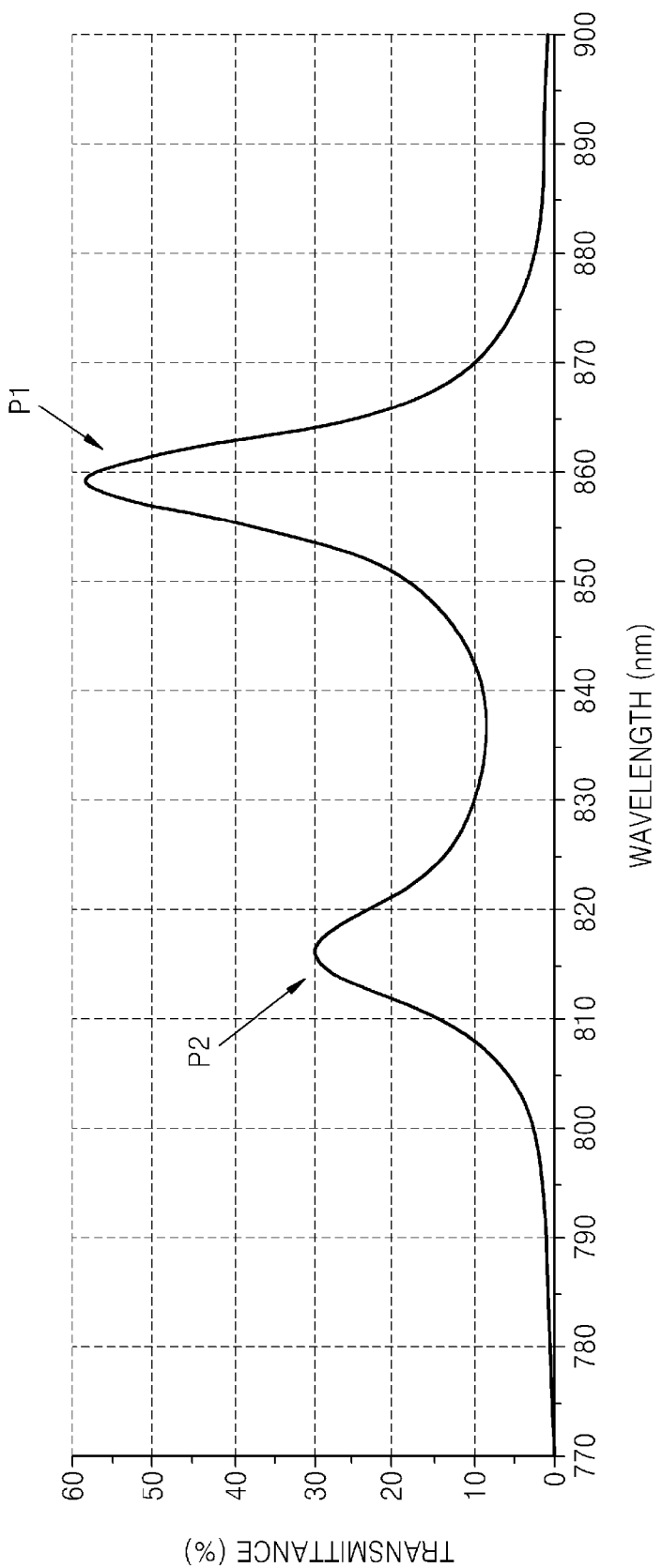
FIG. 5 is a graph of a transmission function in an off-transmission status of the optical modulator of FIGS. 1.

FIG. 5 is a graph of a transmission function or a filter function in an off-transmission status of the optical modulator 10 of FIG. 1. Comparing the transmission function in the off-transmission status with the transmission function in the on-transmission status of FIG. 3, a distance between first and second peaks P1 and P2 of the transmission function is wider in the off-transmission status than in the on-transmission status, the central wavelengths of the first and second peaks P1 and P2 are shifted, and a transmission rate of the second peak P2 is remarkably decreased from 90% to 30% in the transmission function in the off-transmission status. Such results show that when the optical modulator 10 is in the off-transmission status, the light intensity passing through the optical modulator 10 is minimized.

Figure 6:
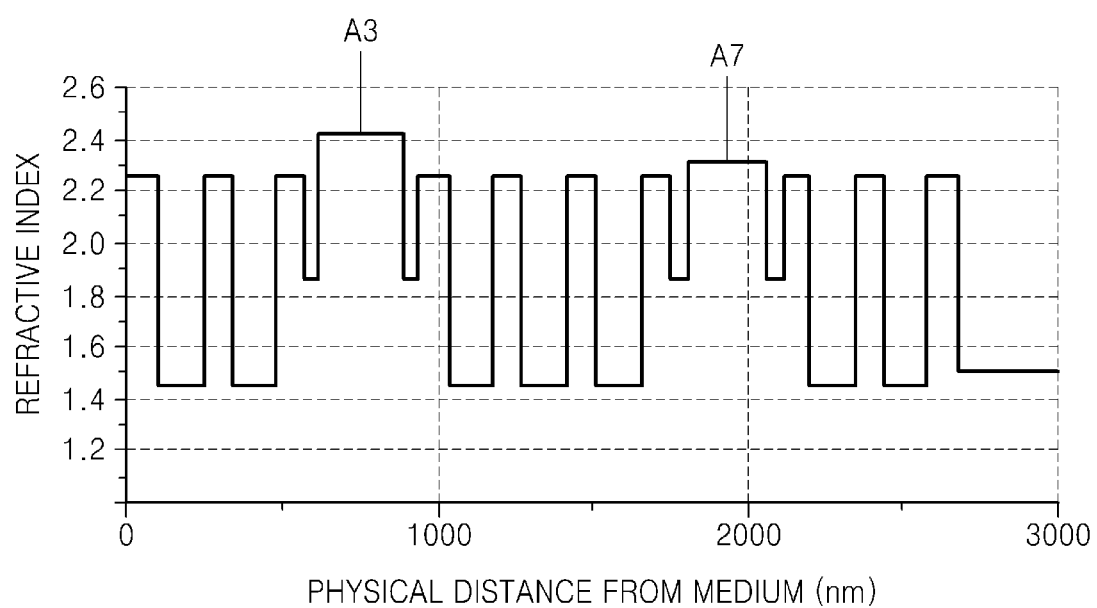
FIG. 6 is a graph of a refractive index profile of an optical modulator having the transmission function of FIG. 5.

When the refractive index profile of the optical modulator 10 is adjusted as shown in FIG. 6, the optical modulator 10 may have the transmission function in the off-transmission status of FIG. 5. In the refractive index profile illustrated in FIG. 6, refractive index profiles A7 and A3 of the first and second electric-optical layers EO1 and EO2 are in opposite statuses of those in FIG. 4. In other words, the refractive index of the second electric-optical layer EO2 is adjusted to have a maximum value, and the refractive index of the first electric-optical layer EO1 is adjusted to have a minimum value. The refractive indexes of the first and second electric-optical layers EO1 and EO2 may be changed by applying voltages to electrode layers disposed on the top and bottom of each of the first and second electric-optical layers EO1 and EO2. Here, the voltages applied to each of the first and second electric-optical layers EO1 and EO2 may be different.

Meanwhile, the optical modulator 10 of FIG. 1 may include more than 2 cavities according to the characteristics of a light source. For example, the optical modulator 10 may include at least 3 cavities for resonance when at least 2 peaks that exist in the light source, aside from the main peak and peaks, are sufficiently spaced apart from each other to be distinguished from each other. Here, the optical modulator 10 may have a transmission function in an on-transmission status and in an off-transmission status by adjusting the refractive index profile of the optical modulator 10.

A method of modulating light by using the optical modulator 10 will now be described.

First, the refractive indexes of the first and second electric-optical layers EO1 and EO2 are adjusted to have the refractive index profiles A7 and A3 of FIG. 4. Then, a first voltage, where the refractive index of the first electric-optical layer EO1 has a maximum value, is applied to the first electric-optical layer EO1 so that the first electric-optical layer EO1 has a maximum refractive index. The first voltage may be applied to the first electric-optical layer EO1 through the first and second electrode layers 32 and 34 respectively disposed on the bottom and top of the first electric-optical layer EO1. When the first voltage is applied, a second voltage, where the refractive index of the second electric-optical layer EO2 has a minimum value, is simultaneously applied to the second electric-optical layer EO2 so that the second electric-optical layer EO2 has a minimum refractive index. The second voltage may be applied to the second electric-optical layer EO2 through the third and fourth electrode layers 36 and 38 respectively disposed on the bottom and top of the second electric-optical layer EO2.

As such, when the first and second voltages are respectively applied to the first and second electric-optical layers EO1 and EO2, the optical modulator 10 has the transmission function in the on-transmission status of FIG. 3. Accordingly, the optical modulator 10 may have the maximum light transmission amount in the on-transmission status with respect to the LED.

Alternatively, when the second voltage is applied to the first electric-optical layer EO1 and the first voltage is applied to the second electric-optical layer EO2, the fist electric-optical layer EO1 has the minimum refractive index and the second electric-optical layer EO2 has the maximum refractive index. Accordingly, the optical modulator 10 has the transmission function in the off-transmission status of FIG. 5. As a result, the optical modulator 10 has the minimum light transmission amount in the off-transmission status with respect to the LED. Voltages applied so that the optical modulator 10 has the transmission function in the off-transmission status may be voltages that break a resonance condition of the optical modulator 10. In other words, the second cavity including the second electric-optical layer EO2 may operate as a mirror of the first cavity. Accordingly, the voltages that break the resonance condition of the optical modulator 10 may be voltages that break a mirror of the first cavity.

According to the method, the light transmission amount of the optical modulator 10 increases in the on-transmission status, and the light transmission amount decreases in the off-transmission status, and thus a ratio of the transmitted light amount in the on-transmission status to the transmitted light amount in the off-transmission status may be large. Accordingly, (T1−T2)/(T1+T2), that is used as a figure of merit (FOM) of the optical modulator 10, increases. Here, T1 denotes a light transmission rate of the optical modulator 10 in the on-transmission status and T2 denotes a light transmission rate of the optical modulator 10 in the off-transmission status.

As described above, according to the one or more of the above exemplary embodiments, the light intensity increases in the on-transmission status of the optical modulator, and the light intensity decreases in the off-transmission status of the optical modulator, with respect to a light source, such as an LED, having a broad bandwidth. Accordingly, a difference between the light intensity in the on-transmission status and the light intensity in the off-transmission status may be increased.

An optical modulator according to an exemplary embodiment includes at least two cavities, and thus the number of layers forming the optical modulator may be less than those in forming an optical modulator including a single cavity. Accordingly, a manufacturing process of the optical modulator may be simplified and manufacturing expenses thereof may be reduced.

It should be understood that the exemplary embodiments described herein should be considered in a descriptive sense only and not for purposes of limitation. Descriptions of features or aspects within each embodiment should be considered as available for other similar features or aspects in other embodiments.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An optical modulator comprising:
   a transparent substrate; and
   a first resonance cavity and a second resonance cavity sequentially stacked on the transparent substrate,
   wherein the first resonance cavity comprises a first electric-optical layer and a first voltage applied to the first electric-optical layer causes a refractive index change of the first electric-optical layer to have a maximum value or a minimum value, and
   wherein the second resonance cavity comprises a second electric-optical layer, and a second voltage, different from the first voltage, applied to the second electric-optical layer causes a refractive index of the second electric-optical layer to have a maximum value or a minimum value;
   wherein the first resonance cavity and the second resonance cavity each comprise a distributed Bragg reflector (DBR) layer and an electrode layer,
   wherein the DBR layer comprises an interfacial layer, a plurality of high refractive index layers, and a plurality of low refractive index layers, wherein the high refractive index layers and the low refractive index layers are alternately stacked.

2. The optical modulator of claim 1, further comprising at least one third resonance cavity comprising a third electric-optical layer.

3. The optical modulator of claim 1, further comprising a DBR layer common to the first and the second resonance cavities.

4. A method of modulating light using an optical modulator, the method comprising:

applying a first voltage to a first electric-optical layer of a first resonance cavity, so as to change a refractive index of the first electric-optical layer; and applying a second voltage to a second electric-optical layer of a second resonance cavity, so as to change a refractive index of the second electric-optical layer, wherein magnitudes of the first and second voltages are different, and the electric-optical layer is a polymer, wherein the applying the first voltage causes a refractive index of the first electric-optical layer to have a maximum value or a minimum value and the applying the second voltage causes a refractive index of the second electric-optical layer to have a minimum value or a maximum value.

5. The method of claim 4, wherein the applying the first voltage and the applying the second voltage causes an optical modulator transmission function in an on-transmission status to be formed.

6. The method of claim 4, wherein the applying the first voltage and the applying the second voltage causes an optical modulator transmission function in an off-transmission status to be formed.

7. The method of claim 4, wherein the applying the first voltage and the applying the second voltage comprises simultaneously applying the first voltage and the second voltage, and then applying the first voltage to the second electric-optical layer and the second voltage to the first electric-optical layer.

* * * * *